Sept. 20, 1938.  T. T. TUCKER  2,130,372
METHOD OF AND APPARATUS FOR INSULATING BUILDINGS
Filed Aug. 8, 1936  5 Sheets-Sheet 2
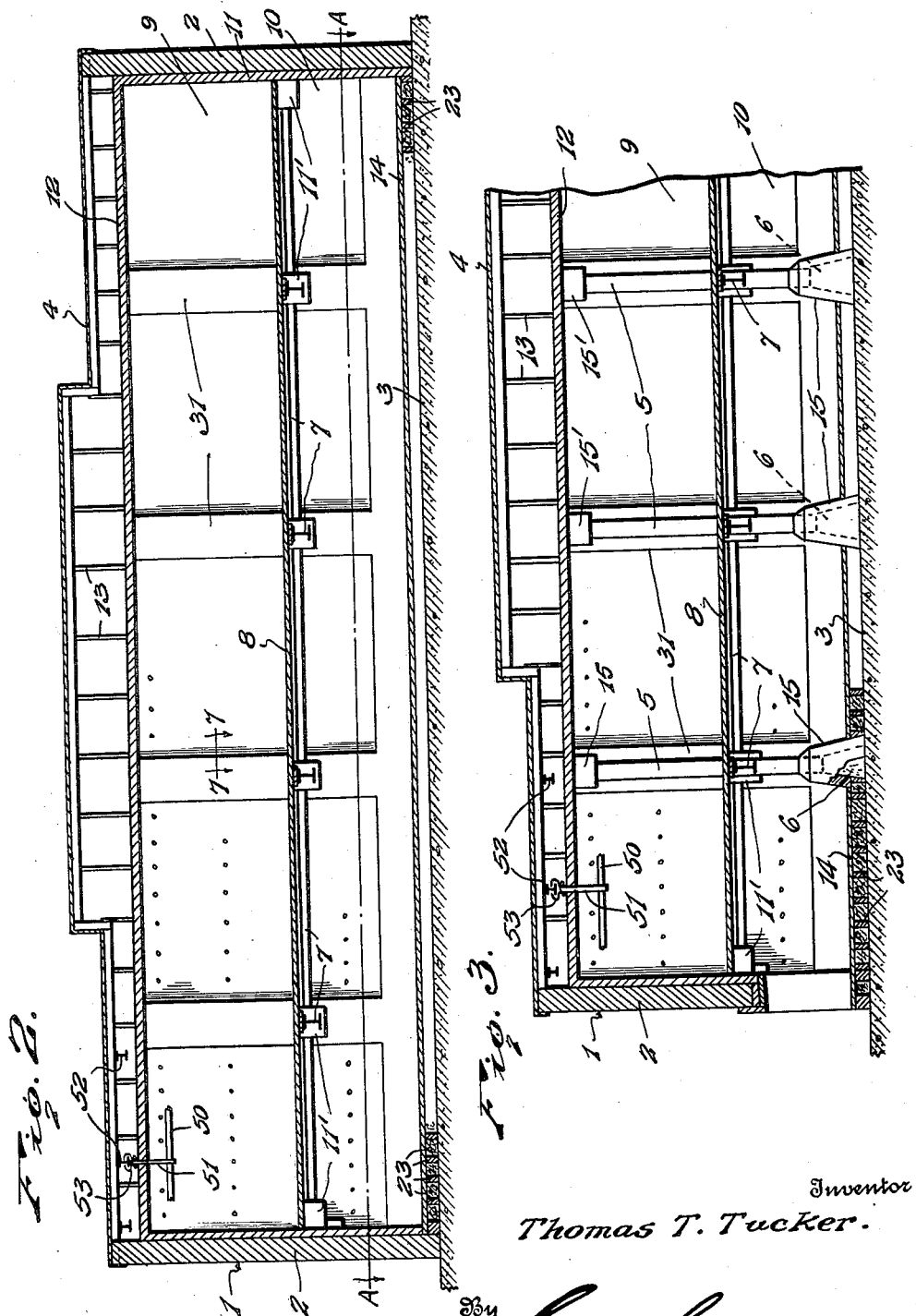
Inventor
Thomas T. Tucker.
By Lacey & Lacey, Attorneys

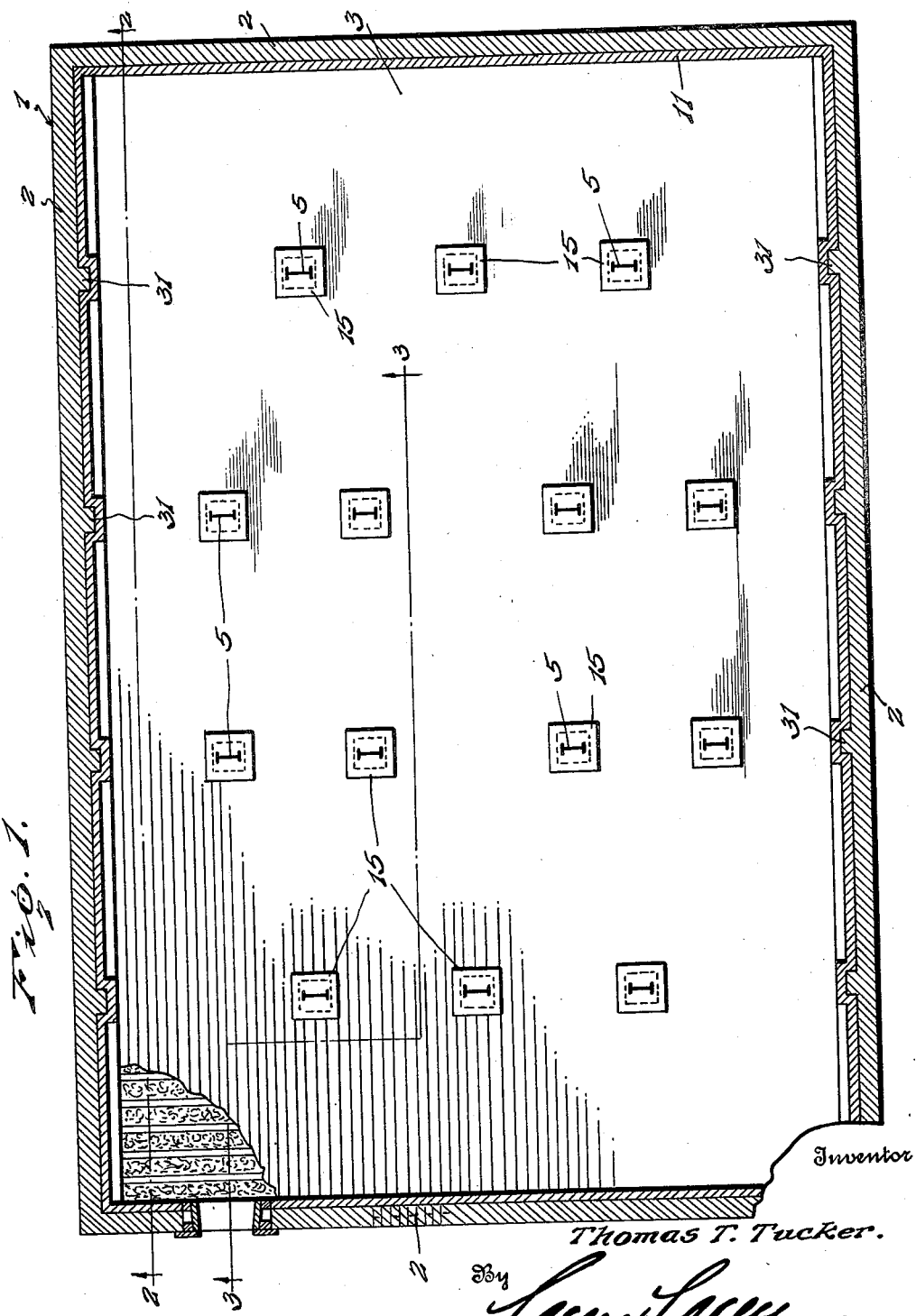

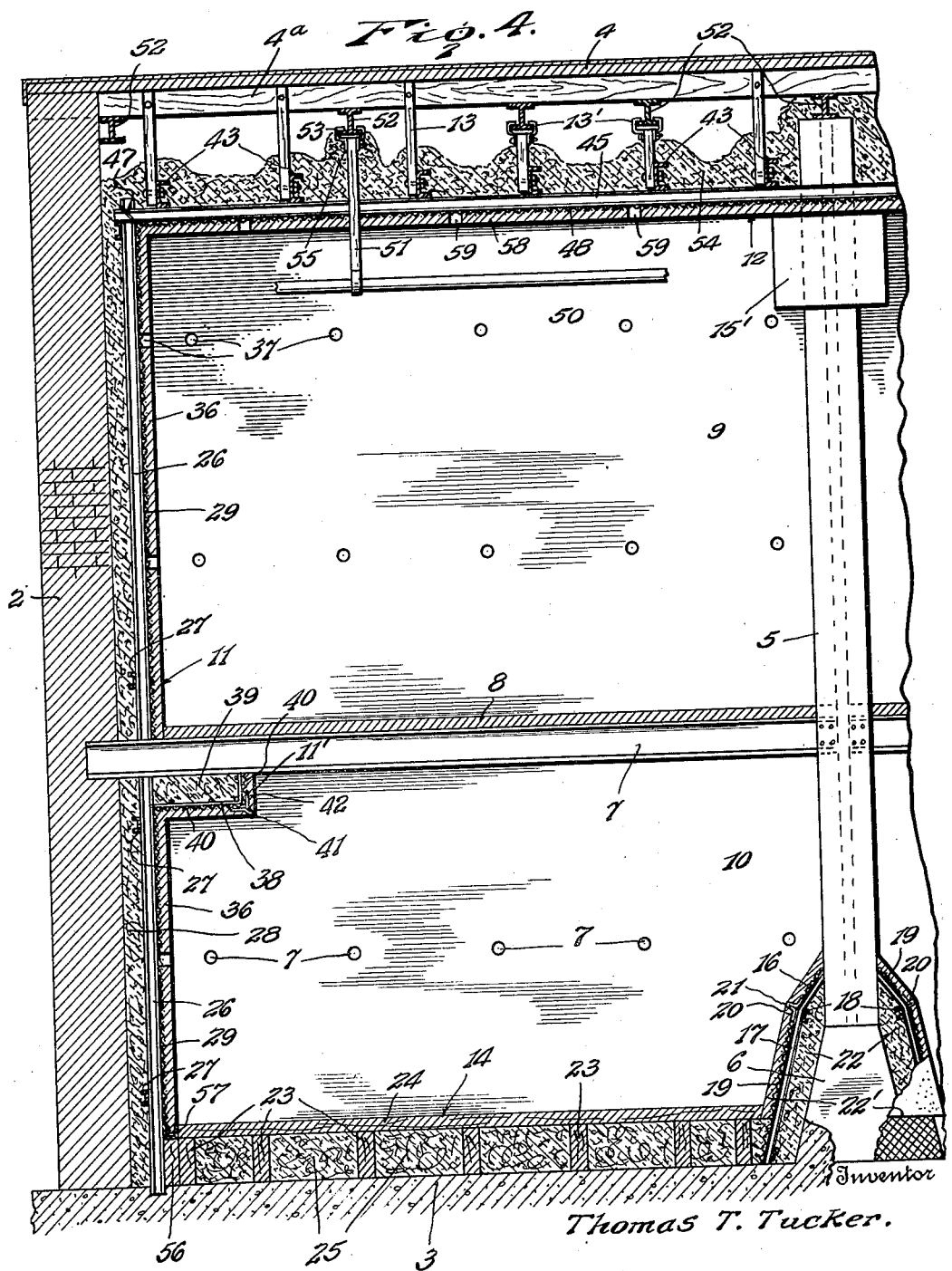

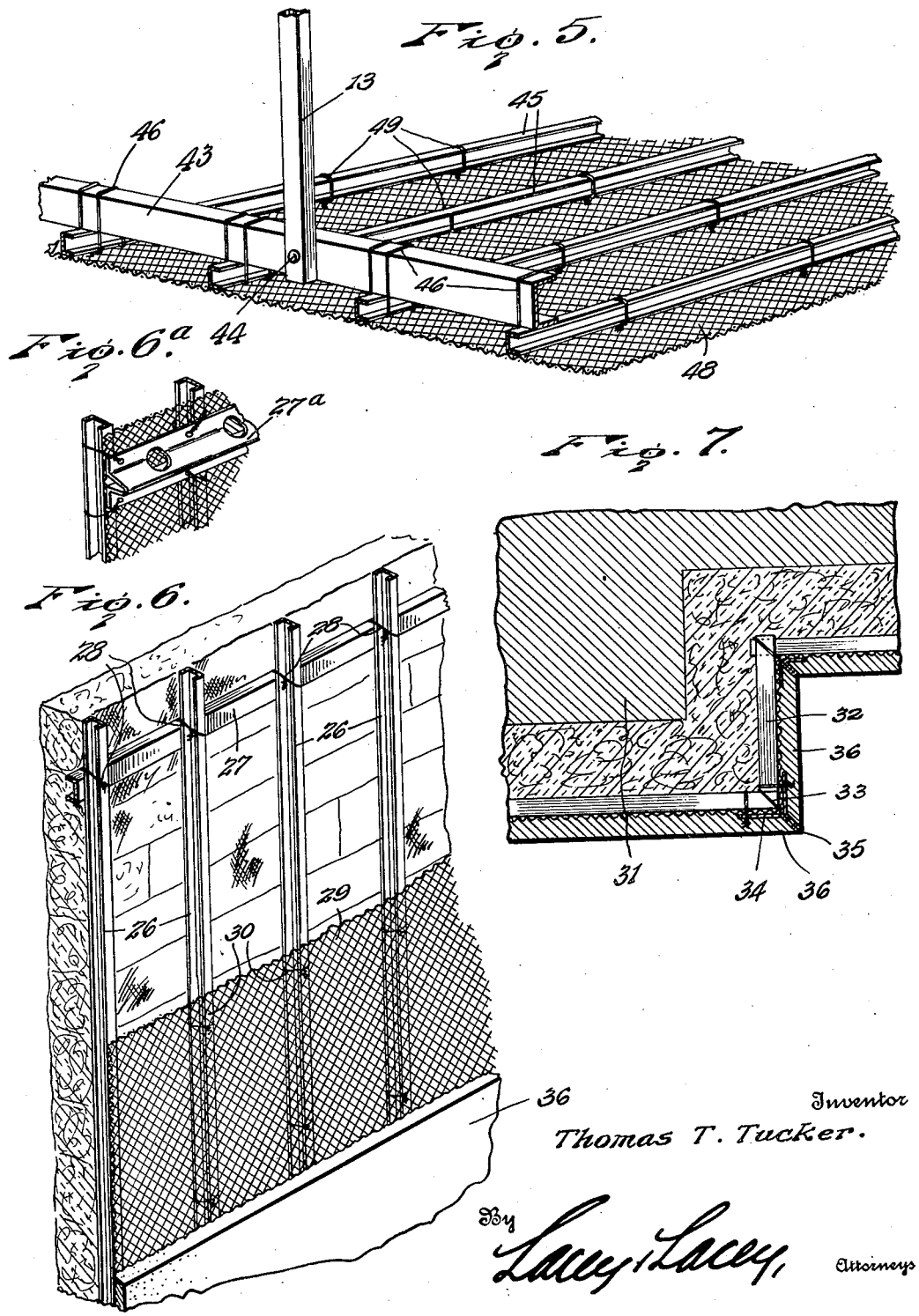

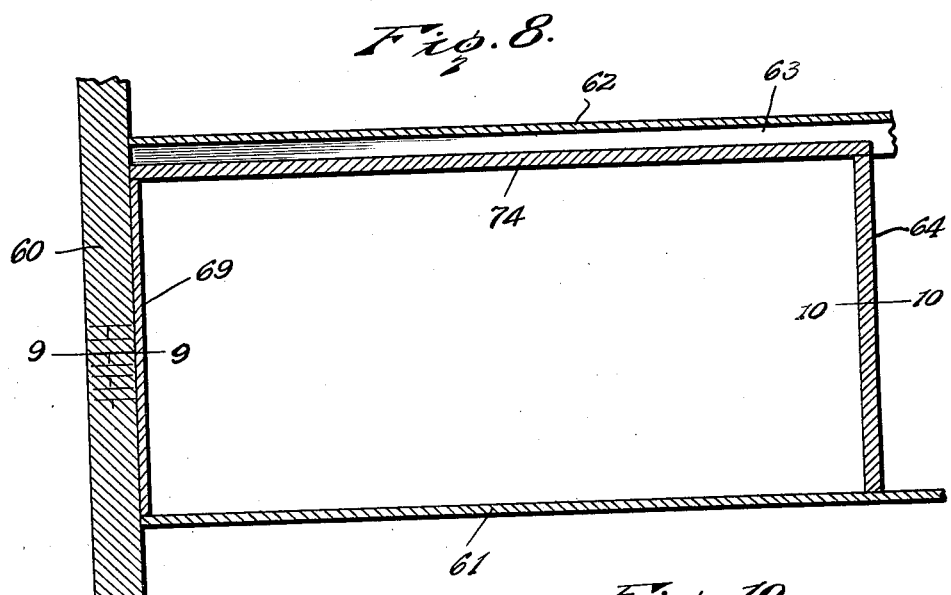
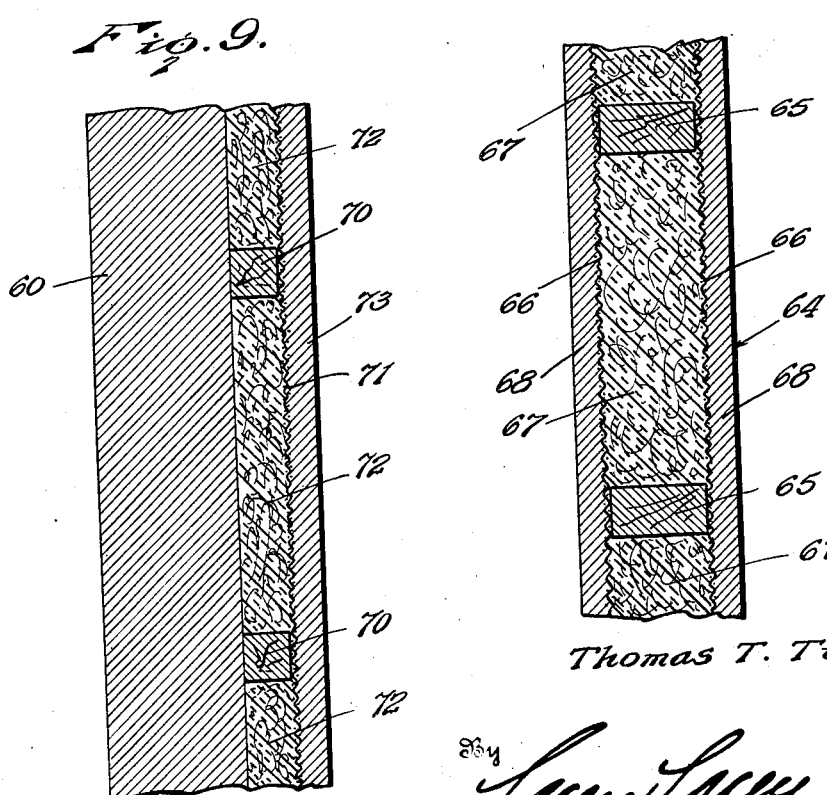

Patented Sept. 20, 1938

2,130,372

UNITED STATES PATENT OFFICE 2,130,372

METHOD OF AND APPARATUS FOR INSULATING BUILDINGS

Thomas T. Tucker, Atlanta, Ga.

Application August 8, 1936, Serial No. 94,994

6 Claims. (Cl. 72—1)

This invention relates to a method of and apparatus for insulating the walls of buildings, and one object of the invention is the provision of improved insulating material so applied to the walls of a building or a room therein that transfer of heat therethrough is substantially eliminated. In carrying out this and other objects of the invention, it has been successfully applied to the walls of rooms or chambers intended to contain a cold atmosphere and accordingly the invention is advantageous for use in providing storage facilities for meat, fruits or vegetables, and furs, garments or the like which must be stored in a cold atmosphere to preserve them.

Another object of the invention is to provide improved means whereby insulating material may be held in place against the walls and floor of a building and also insulation provided under the roof of the building and thus prevent transfer of heat through said walls, floor and roof.

It is another object of the invention to so construct and erect the insulation retaining means that it may be very easily applied to buildings already erected and thus make it unnecessary to provide a special construction in the building itself in order to permit use of the improved insulating material and its retaining means.

Another object of the invention is to so apply the insulating material that it will be confined between a wall and a retainer frame which serves not only to hold the insulating material in place but also as a background to which a coating or facing material may be applied.

It is another object of the invention to not only permit the floors and the walls and roof of a building to be insulated but also permit supporting columns and cross beams to have the insulating material applied to them.

Still another object of the invention is to subject the insulating material to vibration after being applied and thus cause it to become fluffy and entirely fill the confined space in which it is placed.

The invention is illustrated in the accompanying drawings, wherein

Figure 1 is a sectional view taken horizontally through a building insulated in accordance with this invention, the view being taken along the line A—A of Figure 2.

Figure 2 is a sectional view taken vertically through the building along the line 2—2 of Figure 1.

Figure 3 is a fragmentary sectional view taken along the line 3—3 of Figure 1.

Figure 4 is a fragmentary sectional view taken vertically through the building, the view being upon an enlarged scale and illustrating the manner of insulating the building.

Figure 5 is a perspective view showing a portion of the frame which supports the insulating material for the ceiling of a room within the building.

Figure 6 is a fragmentary perspective view illustrating the manner in which the insulating material is applied to the walls of a room.

Figure 6a is a fragmentary perspective view of a modified form of reinforcement.

Figure 7 is a fragmentary sectional view illustrating the manner in which a corner is reinforced.

Figure 8 is a sectional view illustrating the manner in which a room or the interior of a building may be partitioned to form an insulated chamber.

Figure 9 is a sectional view taken horizontally along the line 9—9 of Figure 8.

Figure 10 is a sectional view taken horizontally along the line 10—10 of Figure 8.

The building, which is indicated in general by the numeral 1, may be of any size and configuration desired and has been shown formed with walls 2 which may be of brick construction and rise from a foundation constituting marginal portions of a concrete floor 3 for the building. The roof 4 is of a conventional construction and supported not only by the walls 2 but also by columns 5 which rise from the concrete floor and have their lower portions encased in concrete or cement footings 6. These columns, which are illustrated as strong I-beams but may be of any preferred construction, not only support the ceiling or roof but also stringers 7 extending horizontally intermediate the height of the building and serving as transverse braces for the building and also as supports for an intermediate floor 8 formed of any desired material and dividing the building into upper and lower chambers 9 and 10. Certain of the stringers 7 have end portions embedded in the walls of the building, as shown in Figure 4, while others merely extend from one pillar to another. The building, constructed as set forth above, is of a conventional construction and merely illustrates one type of building which may be insulated in accordance with this invention. At the present time it is customary to insulate a building by applying cork and other types of rigid insulating material to the walls of the building. This has been found unsatisfactory as these materials have a tendency to deteriorate and at times flake off and also rats and mice cut their way through the insulation and build their nests back of the insulation. This not only forms passages or breaks in the insulation through which heat may work its way inwardly and, in addition, causes the insulation to more quickly deteriorate and break off from the walls. By insulating the building in accordance with this invention, the objections set forth above will be overcome.

Referring to Figure 1 it will be seen that insulation is applied to the inner surfaces of the walls of the building, as shown at 11, and by referring to Figures 2 and 3 it will be seen that there has also been provided a ceiling 12 of insulation which may be suspended from the overhead building structure by hangers 13 nailed or otherwise secured to the beams 4a or the hangers may be provided with jaws 13' at their upper ends for gripping steel girders 52. An insulated auxiliary floor 14 is provided over the concrete floor 3; also, end portions of the stringers 7, which are anchored in the walls 2, and the upper and lower portions of the pillars 5 are encased in the improved insulation, as shown at 11', 15, and 15'. The insulation for the lower ends of the pillars 5 is first applied and in doing so a frame 16, formed of vertically extending bars 17 joined by transversely extending strips 18, is erected about the footings 6 and the adjacent lower portion of each pillar. Sheets of metal lathing 19 are applied to each frame 16 with their meeting marginal edge portions overlapped and securely laced together by wire strands. Metal strips 20 are provided along corners of the frame 16 to serve as stiffeners for the frame and as screeds to plaster to and each is crimped to provide side wings secured upon marginal edge portions of adjoining sheets of lathing and an outstanding rib 21. The strips 20 also serve as expansion joints and are perforated to serve as breathers. Padding 22 formed of fluffy insulating material such as mineral wool is confined in the space between each pillar and the adjacent surrounding frame 16, and in the preferred embodiment of the invention, the mineral wool is formed in bats placed in the space enclosed by the frame one against another with their marginal edges in staggered relation to each other. The combined thickness of the bats is somewhat greater than the space which they are to fill and, therefore, they will be held under pressure by the sheets of metal lathing 19 and have a tendency to expand therein which holds them in their proper position and, in addition, insures entire filling of the space. After the mineral wool filler has been inserted and the sheets of metal lathing applied and secured by the strips 20, an outer coating 22' of cement is applied thereto. The coating 22' entirely surrounds and encloses the metal frame and is of a thickness corresponding to or greater than the distance the ribs 21 of the strips 20 project from the sheets of metal lathing. It will thus be seen that the sheets of metal lathing serve to confine the mineral wool and also as a backing and reinforcement for the coating of cement. The insulation 15' for the upper portions of the pillars may be of substantially the same construction as the insulation 15 or of a modified construction.

After the lower portions and footings of the pillars have been encased in the insulating material, an auxiliary floor is laid over the concrete floor 3. This auxiliary floor consists of stringers 23 and upon these stringers is secured a flooring 24 which may be formed of boards or of any conventional type. Before the flooring boards are applied, mineral wool, preferably in the form of bats, is packed between the stringers, as shown at 25, with the meeting end edges of the bats forming each layer offset with respect to the meeting edges of the bats forming another layer. The combined thickness of the bats is greater than the depth of the stringers and, therefore, as the flooring boards are applied and secured to the upper edge faces of the stringers, the packing of insulating material will be compressed and thus caused to completely fill the spaces between the cement floor and the flooring boards of the auxiliary floor. It should also be noted that as nails are driven into place to secure the flooring boards upon the stringers, the vibration created will tend to expand the mineral wool and cause it to completely fill the spaces between the stringers. The auxiliary flooring fits closely about the insulation and plastic facings which enclose the footings of the pillars but marginal portions of the auxiliary floor preferably terminate in spaced relation to the walls of the building a sufficient distance to accommodate the lower portion of the insulation 11 to be applied to these walls.

When applying the insulation to the walls, for example, vertical walls, a metal frame is first erected consisting of vertically extending bars 26 and cross bars 27, each of said bars being preferably formed of channel metal, as shown in Figure 6, or the cross bars may consist of crimped metal strips, as shown at 27a in Figure 6a. The vertically extending bars 26 are spaced from each other, as shown clearly in Figure 6, and the cross bars or strips are secured to the vertically extending bars by anchoring wires 28 which are passed about the intersecting portions of the bars 26 and 27 and twisted until they effect a tight binding engagement one with the other. The cross bars are spaced from each other, as shown in Figure 4, it being understood that any suitable number may be provided according to the height of the wall. The vertical bars extend from the floor 3 to a point adjacent the roof of the building where they are connected with marginal portions of the ceiling 12 of insulating material. Lower ends of the vertical bars may be embedded in the concrete floor or secured in any other desired manner. After the metal framework has been erected, mineral wool to form a packing 28' of insulating material, preferably in the form of bats, is set in place between the wall 2 and the metal frame and sheets of flexible material, such as metal lathing 29, are disposed against the outer flat faces of the vertically extending bars 26 and secured thereto by wires 30 passed around the bars and through perforations of the lathing and then twisted until they effect a tight binding engagement between the bars and the lathing. Marginal portions of the sheets of metal lathing are overlapped and laced with wire to the frame. A vibrator, such as an electric hammer, is then presented towards the lathing with a board between the vibrator and the lathing to effect vibration through the latter upon the insulating material, and as the vibrator and the board are shifted around the lathing, the wool will be agitated and fluffed up so that it completely fills all of the space between the wall and the lathing. If the wall is formed with offset portions 31, the metal frame formed by the bars 26 and 27 follows the outline of the wall, as clearly shown in Figure 7, and end portions of the short bars 32 at opposite sides of the offset portions 31 are connected with companion bars 27 by twisted wire loops 33. If so desired, the members 32 may be formed by bending the bars or strips 27. It should also be noted that metal strips 34 which are crimped to form outstanding ribs 35 corresponding to the ribs 21 of the metal strip 20, are applied at corners of the frame. By this arrangement, the sheet metal lathing will be firmly held in place at the corners of the frame and the outstanding ribs 35 will constitute gages and permit the outer coating or facing 36 of cement or other suitable plastic material to be evenly applied. Breather openings 37 are formed through the plastic coating or the metal screeds to permit a limited circulation of air into the insulation, but these openings are small enough to prevent mice and other rodents from passing through them. The cement should be applied in two or more coats, the first coat being roughened by cross scratching and when it has substantially set, the second coat is applied and roughened in a similar manner, if another coat is to be applied. In applying the last coat, it should be floated or troweled to a dense smooth surface. It should also be noted that after the mineral wool has been packed between the wall and the metal frame and the sheets of metal lathing secured in position, but before the plastering has started, a vibrator will be applied to the metal lathing and moved along and across the same to vibrate the mineral wool and cause it to expand after being compressed by the metal lathing so that all of the space between the wall and the metal frame will be filled with the insulating material. The outer end portions of the floor supporting beams 7 should also be insulated and, therefore, the extensions 11' have been provided. Referring to Figure 4, it will be seen that, in order to form the extensions 11', a metal frame 38, which is anchored to the metal frame of the wall, is built about the portion of each beam 7 which projects from the adjacent wall insulation and, after the space between the beams and the frame or cage 38 has been filled with mineral wool, as shown at 39, metal lathing 40 is applied to the cage and secured by twisted wires and also by metal strips 41 corresponding to the metal strips 21 and 34. An outer coating 42 of cement may then be applied in the same manner in which the cement coating 36 is applied and end portions of the floor supporting beams which are anchored in the walls will be encased and thoroughly insulated. If so desired, the remaining portions of the beams 7 may be encased in frames similar to the frame 38 so that each of the floor beams may be insulated for its entire length. It will also be obvious that the portions of the pillars or columns 5 between their insulated lower portions and the floor 8 and between the floor 8 and the insulated ceiling 12 may be enclosed by frames packed with insulating material and coated with cement.

The auxiliary ceiling or insulating ceiling 12 is constructed as shown in Figures 4 and 5, and referring to these figures it will be seen that this ceiling has a metal frame suspended from the roof of the building by the hangers 13 and consists of supporting bars 43 which have been shown secured to the hangers 13 by bolts 44, but may be secured by clips or wire or in any other manner desired, and cross bars 45 which are secured against under faces of the supporting bars 43 by wire yokes 46. The supporting bars 43 and the cross bars 45 are all formed of channel metal, as shown in Figure 5, but the supporting bars are of greater dimensions than the cross bars. The hangers 13 have been shown formed of wood so that they may be nailed to the roof beams of the building, but it is to be understood that they may be formed of metal if so desired and have their upper ends bolted or otherwise secured to the roof beams. If so desired the hangers may have their upper ends connected with beams 52 or the like by clamps 13'. While the ceiling frame has been shown suspended from the roof of the building, it may be suspended from the flooring structure of the building or from any other overhead support convenient. By referring to Figure 4, it will be seen that the cross bars which are spaced from each other, as shown in Figure 5, have their ends disposed against upper ends of the vertically extending bars 26 where they are secured by wires 47. The supporting bars 43 may also have their ends secured to vertically extending bars of the wall frame. It will thus be seen that the ceiling frame will be connected with the wall frame and, therefore, the ceiling frame will be supported not only by the hangers 13 but also by the wall frame. Sheets of metal lathing 48 are secured against the under side faces of the cross bars 45 and secured thereto by twisted wire loops 49. The metal lathing may have marginal edge portions wired to upper edge portions of the metal lathing applied to the wall frame. A suitable number of circulating pipes 50 for a freezing medium are provided in the building, each pipe being supported by hangers 51 (one only being shown), which extend upwardly through the metal lathing and have their upper ends connected with certain of the I-beams 52 of the roof by clamps 53. It will thus be seen that the circulating pipes 50 may be suspended from the I-beams of the roof in a conventional manner. As the sheets of metal lathing are applied to the cross bars 45, they may be easily secured by passing the wires 49 around these bars and through the metal lathing and then twisting ends of the wires together. After each sheet of metal lathing has been applied and secured, the mineral wool is set in place over the lathing between the cross bars 45 to form the packing 54 of insulating material. The last sheet of lathing is insulated as the lathing is being secured in position. After all of the lathing has been applied, the entire area of the ceiling is vibrated in the same manner as heretofore described in vibrating the insulation applied to other walls, to fluff the insulation and insure the elimination of cracks and joints therein. The portions of the hangers 51 extending upwardly from the ceiling frame to the I-beams of the roof are encased with mineral wool by wrapping or piling the mineral wool about them, as shown at 55 in Figure 4, and attention is called to the fact that about margins of the insulating ceiling, the mineral wool overlies the mineral wool of the insulation for the walls. The insulation is also wrapped or piled about upper portions of the columns 5 which extend above the insulating ceiling. Therefore, the entire interior of the building will be encased by insulating material to prevent the transfer of heat through its walls. Spaces between the lower ends of the wall frame are filled with mineral wool packing, as shown at 56, and in order to separate this packing from the cement 36 and provide a good support for the lower end of the cement facing, there has been provided a strip 57 formed of channel metal secured to the vertically extending bars 26. A facing 58 formed of cement and corresponding to the cement facing 36 is applied to the metal lathing of the insulating ceiling and at its margins joins the cement facings 36 of the walls. Breather openings 59 corresponding to the openings 37 are formed through the facing of the ceiling. It will thus be seen that the walls, floor and roof of the building will be thoroughly insulated by mineral wool packed tightly into place and the insulation shielded by a facing of cement.

In some instances, it is desired to provide an insulated chamber by partitioning off a portion of the interior of a building or a portion of a room in the building. Such a construction is illustrated in Figures 8, 9 and 10, Figure 8 being a semi-diagrammatic view and Figures 9 and 10 sectional views illustrating in detail the manner in which insulation is applied to the walls of a building and the manner in which an insulating partition is constructed. Referring to Figure 8 it will be seen that a main wall of the building is designated by the numeral 60, an existing floor by the numeral 61 and a ceiling by the numeral 62. This ceiling is of a conventional construction and includes the usual ceiling beams or joists 63. In order to partition off a portion of the main room, the partition 64 is erected and is of such height that it extends from the original floor 61 to the ceiling beams. If the chamber is to extend the full width of an existing room, only one partition will be required, but if it is to be of less width than the room, it will be necessary to have one or more partitions to provide side walls for the chamber, as well as the partition 64 which constitutes an end wall for the chamber.

The partition 64 is constructed as illustrated in Figure 10, and referring to this figure it will be seen that a suitable number of studdings are arranged vertically in transverse spaced relation to each other with their lower ends anchored to the floor in any desired manner and their upper ends secured to the ceiling beams. Sheets or strips of metal lathing 66 are secured against the opposite edge faces of the studdings 65 and, together with the studdings, provide pockets into which mineral wool is packed, as shown at 67. The metal lathing is then subjected to vibrations, in the manner already set forth, in order to cause the mineral wool to be fluffed and completely fill the pockets. The sheets of metal lathing are then coated with plastic, as shown at 68, in the same manner previously described, and a partition or end wall capable of preventing the transfer of heat through it will be formed. The studdings may be of 2" x 4" cross sectional area or of any size desired, or the studdings may be of steel channel construction, in which case the partition 64 will be provided at opposite sides with retaining frames constructed in accordance with the disclosure in Figure 6.

The portion of the main wall 60 which constitutes an end wall for the chamber must also be insulated, as shown at 69, and this insulation is applied as shown in Figure 9. Referring to Figure 9 it will be seen that a suitable number of studdings 70 are provided which may be of 2" x 2" area in cross section or of the same size as the studdings 65. The studdings 70 are secured vertically against the wall 60 in any desired manner in transverse spaced relation to each other and extend from the floor 61 to the ceiling beams 63. Metal lathing 71 is secured against the outer side edge faces of the studdings 70 and, together with the studdings and the main wall 60, define pockets or spaces which are filled with mineral wool, as shown at 72. This metal lathing is also subjected to vibrations to fluff the mineral wool and cause it to expand and completely fill the pockets in which it is placed, after which a plastic coating 73 is applied to the lathing. It is to be understood that this wall of the building may be insulated as hereinbefore described, that is, steel studdings will be used in place of wood and the retaining wall constructed as shown in Figure 6. If the main walls of the building constitute the side walls for the chamber, they will be insulated the same as the wall 60 or if partitions are erected to form the side walls, they will be constructed as shown in Figure 10. It will also be obvious that, if so desired, a partition corresponding to the partition 64 may be provided for each end of the storage chamber instead of insulating a main wall of the building. The floor of the storage chamber may be insulated, if so desired, in which case it will be provided with an auxiliary floor corresponding to the floor 14 shown in Figure 4.

The ceiling of the storage chamber should be insulated in order to prevent the transfer of heat through the floor 62 for the upper room of the building. When forming this ceiling insulation, which is designated by the numeral 74, sheets or strips of metal lathing are secured against the lower edge face of the ceiling beams with their marginal portions united to the inner metal lathing of the partition 64 and to the metal lathing of the side and end walls of the chamber. Mineral wool is confined between the metal lathing of the ceiling insulation and the ceiling and will be supported upon the metal lathing of the ceiling insulation. This ceiling insulation is quite similar to the insulation illustrated in Figure 4 as it consists of mineral wool supported upon metal lathing but the metal lathing is secured directly against the ceiling beams 63 or may be carried by a suspended frame. A plastic coating is applied to the metal lathing of the ceiling insulation. It will thus be seen that when the storage chamber is completed, its walls and ceiling will all be insulated so that heat or cold cannot pass through them.

To those skilled in the art to which my invention relates, many changes in construction and widely differing embodiments and applications of the invention will be apparent without departing from the spirit and scope of the appended claims. My disclosures and the description herein are purely illustrative and not intended to be in any sense limiting.

Having thus described the invention, what is claimed as new is:

1. The method of insulating an enclosure comprising erecting wall frames consisting of spaced supports and foraminous sheets carried thereby, packing masses of fluffy mineral wool between the wall frames and walls of the enclosure during erection of the wall frames, and vibrating the foraminous sheets of the wall frames to agitate and fluff the mineral wool material to completely fill the space between the walls and the wall frames.

2. In combination with an enclosure having walls forming a floor, sides and a ceiling, foraminous confining means spaced from certain of the walls, fluffy heat-insulating means packed in the space between the walls and said confining means and expanded to completely fill the space, and a coating forming a facing on the outer surface of the confining means.

3. In combination with an enclosure having walls forming a floor, sides and a ceiling, and means for insulating certain of the walls against passage of heat comprising retainer frames related to the walls and consisting of bars spaced transversely from each other and cross bars in spaced relation to each other secured against inner faces of the first mentioned bars, sheets of foraminous material secured against the outer faces of the last mentioned bars, fluffy and expansible heat-insulating material packed in space between the frames and walls and held under compression by the frames and expanded to completely fill the space, and a coating of material applied to the outer surfaces of the foraminous sheets and forming a facing therefor.

4. In combination with an enclosure having walls forming a floor, sides and a ceiling, and means for insulating certain of the walls comprising retainer frames spaced from the walls and consisting of bars spaced transversely from each other and cross bars in spaced relation to each other secured against inner faces of the first mentioned bars, metal lathing secured against outer faces of the last mentioned bars and consisting of foraminous sheets having meeting edges, metal strips secured in overlying relation to adjoining marginal portions of said sheets and having outstanding ribs, fluffy heat-insulating material packed in space between the frames and walls under compression and expanded to fill the space, and a coating material carried by the metal lathing and corresponding in depth to the distance from the sheets to outer edges of the ribs.

5. In combination with an enclosure having a floor, walls, a ceiling, supporting pillars for the ceiling and partition supporting beams secured to the pillars and having end portions anchored in the walls, of insulating means for lower and upper portions of the pillars, each consisting of a frame erected about a pillar in spaced relation thereto, metal lathing secured upon said frame and consisting of sheets of foraminous material, fluffy and expansible heat-insulation filling space between the frame and pillar, the insulation being held compressed by said lathing and expanded by vibration to completely fill the space, and a coating of set plastic for the lathing.

6. In means for forming a wall to prevent the transfer of heat, the combination of a skeleton frame adapted to be related to a wall, fluffy heat-insulating material packed in the spaces formed by said frame, and flexible sheeting secured to said frame and arranged to confine said material in said spaces, said material being expanded to completely fill the spaces within said sheeting.

THOMAS T. TUCKER.